(12) United States Patent
Ault

(10) Patent No.: US 12,038,384 B2
(45) Date of Patent: Jul. 16, 2024

(54) FACILE COLORIMETRIC DETECTION OF AMBIENT AEROSOLS

(71) Applicant: The Regents of the University of Michigan, Ann Arbor, MI (US)

(72) Inventor: Andrew Ault, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 607 days.

(21) Appl. No.: 17/254,154

(22) PCT Filed: Jun. 27, 2019

(86) PCT No.: PCT/US2019/039483
§ 371 (c)(1),
(2) Date: Dec. 18, 2020

(87) PCT Pub. No.: WO2020/006217
PCT Pub. Date: Jan. 2, 2020

(65) Prior Publication Data
US 2021/0270745 A1    Sep. 2, 2021

Related U.S. Application Data

(60) Provisional application No. 62/692,438, filed on Jun. 29, 2018.

(51) Int. Cl.
*G01N 21/80*        (2006.01)
*G06F 18/22*        (2023.01)
(Continued)

(52) U.S. Cl.
CPC ............. *G01N 21/80* (2013.01); *G06F 18/22* (2023.01); *G06T 7/0002* (2013.01); *G06T 7/11* (2017.01);
(Continued)

(58) Field of Classification Search
None
See application file for complete search history.

(56) References Cited

U.S. PATENT DOCUMENTS

2009/0215027 A1    8/2009    Houlberg
2010/0279427 A1    11/2010   Jang
(Continued)

OTHER PUBLICATIONS

Ganor et al., "Determining the Acidity and Chemical Composition of Fog, Haze and Cloud Droplets in Israel", Atmospheric Environment, May 15, 1993, vol. 27A, No. 12, pp. 1821-1832.
(Continued)

*Primary Examiner* — Xiaoyun R Xu
(74) *Attorney, Agent, or Firm* — Lempia Summerfield Katz LLC

(57) ABSTRACT

Various non-limiting examples of improved methods, devices, and systems for colorimetric detection of ambient aerosols are disclosed herein. For example, in certain embodiments, the methods, devices, and systems include direct measurement of size-resolved aerosol acidity from pH 0-4.5 using quantitative colorimetric image processing of mobile devices (e.g., a cellular phone) of aqueous aerosol particles impacted onto pH-indicator paper. One method includes collecting the ambient aerosol on a colorimetric pH sensitive surface; capturing, using a camera, an image of the colorimetric paper within a predefined period of time following the collecting of the ambient aerosol; and determining, by a processor, the pH of the ambient aerosol through a visual analysis of the captured image.

19 Claims, 14 Drawing Sheets

(51) Int. Cl.
*G06T 7/00* (2017.01)
*G06T 7/11* (2017.01)
*G06T 7/90* (2017.01)

(52) U.S. Cl.
CPC ...... *G06T 7/90* (2017.01); *G06T 2207/10024* (2013.01); *G06T 2207/20021* (2013.01)

(56) References Cited

U.S. PATENT DOCUMENTS

| | | |
|---|---|---|
| 2010/0288057 A1 | 11/2010 | Witham |
| 2015/0055134 A1 | 2/2015 | Papautsky |
| 2015/0359458 A1 | 12/2015 | Erickson |
| 2016/0080548 A1 | 3/2016 | Erickson |

OTHER PUBLICATIONS

Jang et al., "Colorimetric Particle Acidity Analysis of Secondary Organic Aerosol Coating on Submicron Acidic Aerosols", Aerosol Science and Technology, Jun. 17, 2008, vol. 42, pp. 409-420.

Li et al., "Aerosol Acidity Measurement Using Colorimetry Coupled With a Reflectance UV-Visible Spectrometer", Aerosol Science and Technology, Jun. 13, 2012, vol. 46, pp. 833-842.

International Preliminary Report on Patentability in International Patent Application No. PCT/US2019/039483, dated Dec. 29, 2020, 8 pages.

International Search Report in International Patent Application No. PCT/US2019/039483, dated Aug. 21, 2019, 2 bages.

Li et al., "Aerosol Acidity Measurement Using Colorimetry Coupled with a Reflectance UV-Visible Spectrometer", Aerosol Science and Technology, 2012, pp. 833-842, vol. 46.

Peter Peterson, pkpeterson/pH_Paper_analysis: pH Paper Analysis (Version v1.0.0), Oct. 25, 2017.

FIG. 10

FACILE COLORIMETRIC DETECTION OF AMBIENT AEROSOLS

This application is a § 371 nationalization of PCT Application Serial No. PCT/US2019/039483, filed Jun. 27, 2019, designating the United States, which is hereby incorporated by reference in its entirety, and this application claims the benefit of U.S. Provisional Patent Application No. 62/692,438, filed on Jun. 29, 2018, which is hereby incorporated by reference in its entirety.

TECHNICAL FIELD

The present disclosure generally relates to colorimetric methods of detection of ambient aerosols, and more particularly relates to colorimetric methods of detection of the pH-level (e.g., acidity level) of an ambient aerosol.

BACKGROUND

Atmospheric aerosols have global impacts on human health (e.g., approximately 10% of global deaths annually) and climate (e.g., due to effects on radiative forcing and cloud formation). Measuring the acidity of atmospheric aerosols is critical, as many key multiphase chemical reactions involving aerosols are highly pH dependent. These reactions impact processes, such as secondary organic aerosol (SOA) formation, that impact climate and health. Despite their importance, mechanistic understanding is low for many key atmospheric processes, such as secondary organic aerosol (SOA) formation. Aerosol acidity is a critical property for SOA formation, specifically epoxide ring opening reactions, as the reaction rates of pH-dependent multiphase chemical processes can vary by five orders of magnitude within relevant atmospheric pH values (0-5), leading to lifetimes for key species that vary from minutes to weeks.

Determining the pH of atmospheric particles, which have minute volumes ($10^{-23}$-$10^{-18}$ liters), is an analytical challenge due to the non-conservative nature of the hydronium ion, particularly as most chemical aerosol measurements are made offline or under vacuum, where water can be lost and acid-base equilibria shifted. Because of these challenges, there have been no direct methods to probe atmospheric aerosol acidity, and pH has typically been determined by proxy/indirect methods, such as ion balance or thermodynamic models.

Other multiphase chemical processes where acidic pH conditions are important include gas-aerosol phase partitioning, heterogeneous reactions, water uptake, hydrolysis, liquid-liquid phase separations, metal ion dissolution and solubility, and photolysis and OH radical reaction chemistry. Recent work has predicted through indirect methods that aerosol particles are often acidic, which has important implications for the processes listed above. However, in addition to a lack of direct measurements, there is both variability and uncertainty regarding atmospheric aerosol acidity due to differing source contributions, seasonality, and regional location, such as urban versus rural areas.

Aerosol acidity is difficult to measure due to the non-conservative nature of $H^+$ concentration and its dependence on relative humidity (RH) and aerosol liquid water content. As such, indirect filter-based measurements or proxy methods to predict pH are often used. Filter-based methods involve extraction with solvents that can lead to changes in ion distribution, thus measurements are associated with higher uncertainty than those of proxy methods, which include ion balance, molar ratio, phase partitioning, and thermodynamic equilibrium models, with the latter two regarded as the most accurate. For the phase partitioning method, gas and aerosol phase measurements of semi-volatile compounds, such as $NH_3/NH_4^+$, are used to indirectly measure pH. Thermodynamic models, such as E-AIM and ISORROPIA-II, predict aerosol pH based on measured chemical species (e.g., sulfate and ammonium concentrations), temperature, and RH and have been increasingly applied to evaluate aerosol acidity and variability.

Given the lack of approaches to directly measure pH, these models have driven the knowledge of aerosol acidity, but have also had few experimental measurements of pH to constrain their results. In particular, the thermodynamic models are most accurate when they can be constrained by measurements of both gas and aerosol phase chemical components. Both the phase partitioning method and thermodynamic models are sensitive to input measurement values and their associated uncertainties, which can be high for species such as ammonia. Also, both assume gas-particle phase equilibrium, which is not always accurate, especially as aerosol often have low liquid water content or high ionic strength. Additionally, neither method fully accounts for organic components, which are ubiquitous in the atmosphere. This is a limitation as organic acids can influence acidity levels.

It should be noted that a few thermodynamic models make accommodations for organic species, such as a small number of dicarboxylic acids that can be incorporated into E-AIM calculations or a wider selection of organic compounds/functional groups available within AIOMFAC (Aerosol Inorganic-Organic Mixtures Functional groups Activity Coefficients), though AIOMFAC is rarely utilized for aerosol pH predictions. Direct measurement of aerosol pH is needed to provide an analytical determination of pH to constrain both model and proxy methods, particularly when the available methods disagree.

Currently, direct measurement of aerosol acidity is limited. One method uses colorimetric analysis integrated with a reflectance UV-Visible spectrometer to measure the proton mass concentration of particle samples collected on dyed filters. While this technique does not rely on solvent extraction, it is an offline method that infers pH from an estimate of proton mass based on a correlation with the measured absorbance of the pH-sensitive dye. Another method uses Raman microspectroscopy to quantify concentrations from the vibrational modes of an acid and its conjugate base, allowing their equilibrium to be determined. The concentrations are then combined with activity coefficient calculations to determine pH of individual particles. Application of this method is limited though, as it has only been used to measure pH for laboratory-generated super-micron particles composed of simple chemical compositions.

As such, there remains a need to develop devices, systems, and methods for improved colorimetric analysis of ambient aerosols.

SUMMARY

Various non-limiting examples of improved methods, devices, and systems for colorimetric detection of ambient aerosols are disclosed herein. In certain embodiments, a method includes collecting the ambient aerosol on a colorimetric pH sensitive surface; capturing, using a camera, an image of the colorimetric paper within a predefined period of time following the collecting of the ambient aerosol; and determining, by a processor, the pH of the ambient aerosol through an analysis (e.g., visual analysis) of the captured image.

In another embodiment, a system is provided for determining a pH of an ambient aerosol. The system includes a colorimetric pH sensitive surface configured to collect the ambient aerosol; a camera configured to collect a digital image of the colorimetric pH sensitive surface within a predefined period of time following the collection of the ambient aerosol; and a processor configured to determine the pH of the ambient aerosol through an analysis (e.g., visual analysis) of the captured image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWING FIGURES

For a more complete understanding of the disclosure, reference is made to the following detailed description and accompanying drawing figures, in which like reference numerals may be used to identify like elements in the figures.

Figures 9A, 9B, 9C:
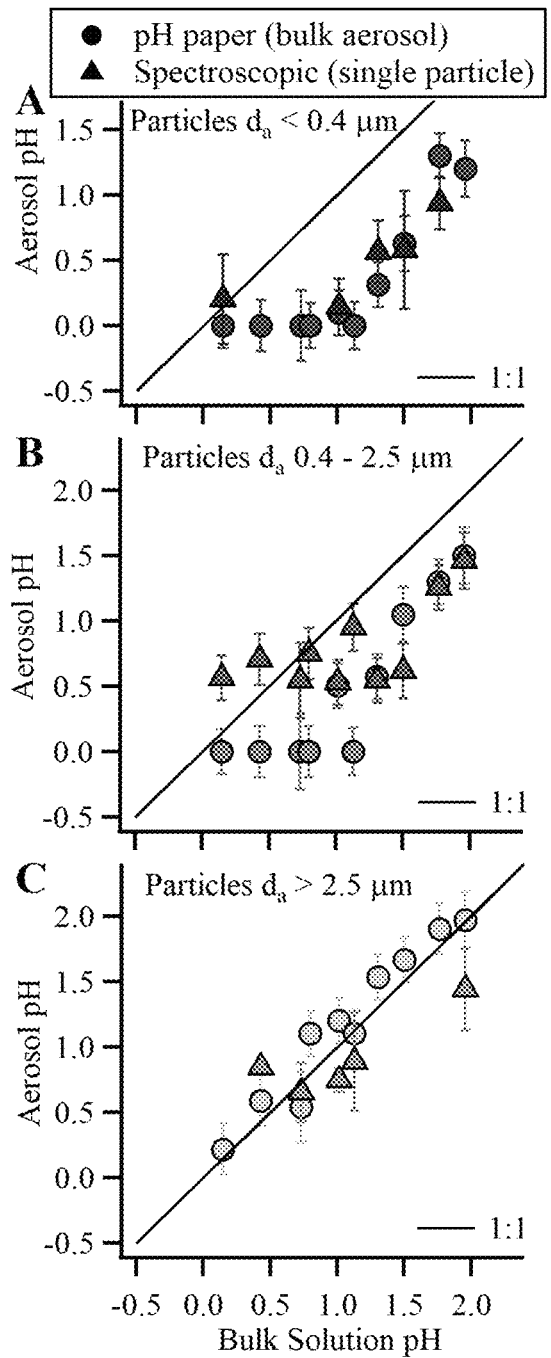
Figures 11A, 11B, 11C, 11D, 11E:
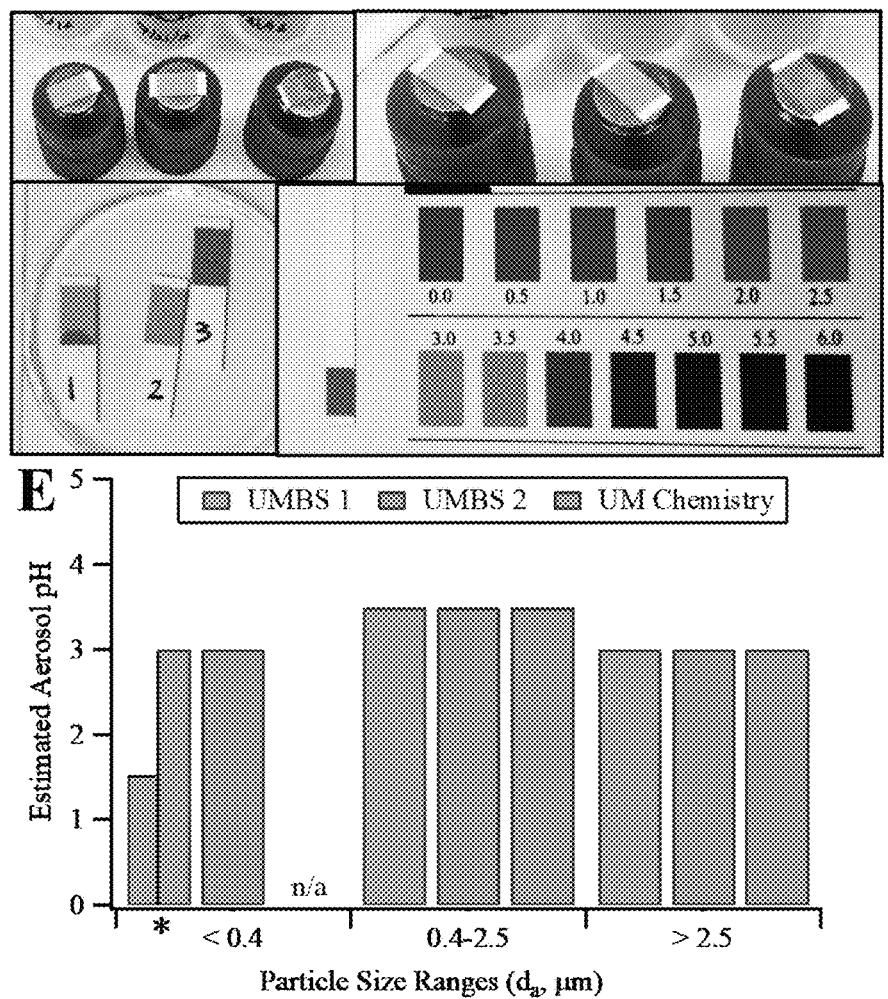
Figures 12A, 12B:
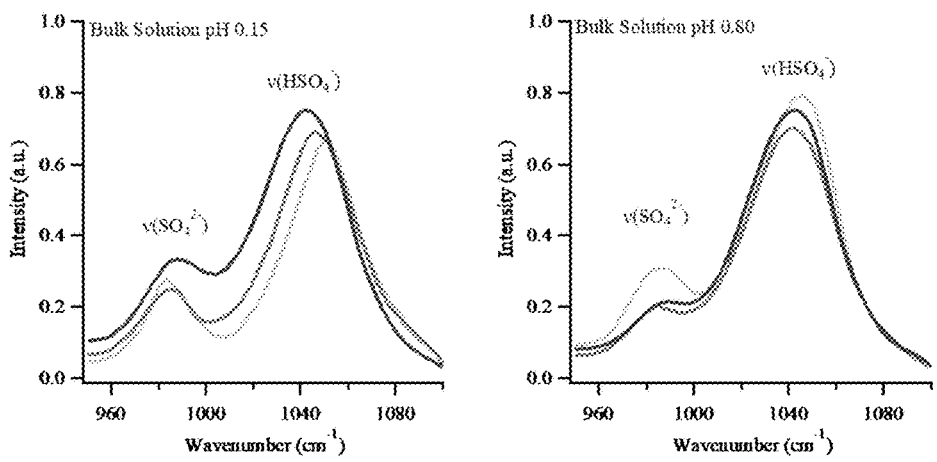
Figure 12C:
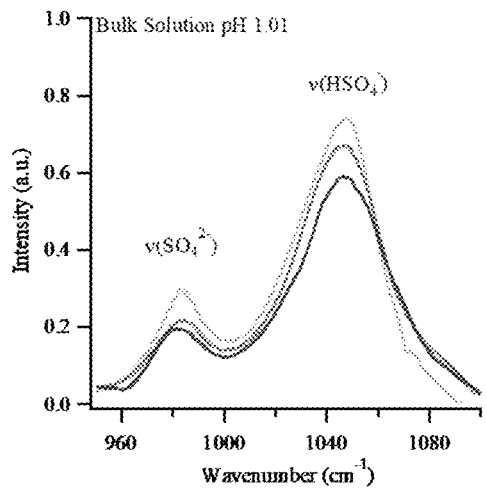
Figure 12D:
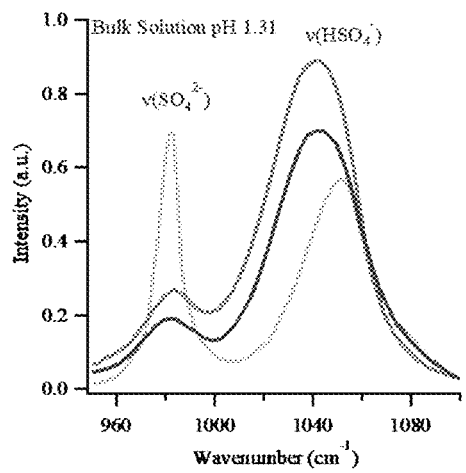
Figure 12E:
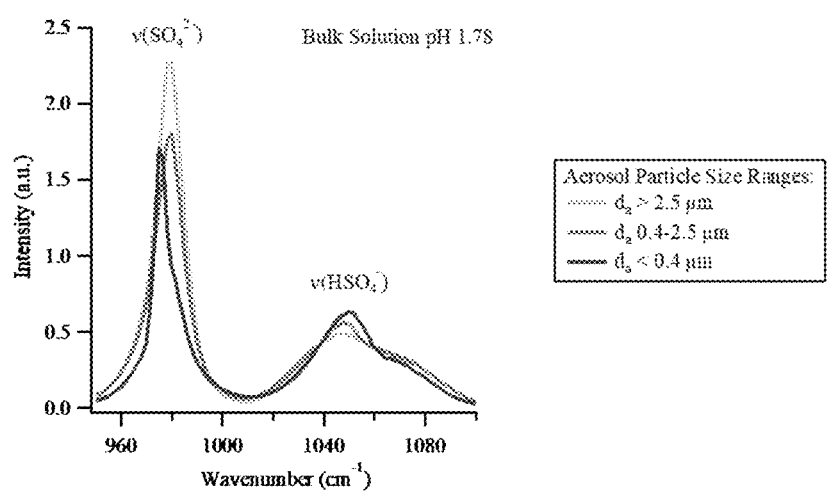

FIGS. 9A-9C depict examples of aerosol pH as a function of the pH of the bulk solution from which the particles were generated to compare pH indicator paper and Raman spectroscopic methods for measuring aerosol pH for particles (A) $d_a$<0.4 μm, (B) $d_a$ 0.4-2.5 μm, and (C) $d_a$>2.5 μm. Error bars for the pH indicator paper data corresponds to uncertainty in the measurements across multiple trials. Error bars for the Raman spectroscopic data corresponds to standard deviation of multiple trials.

Figure 10:
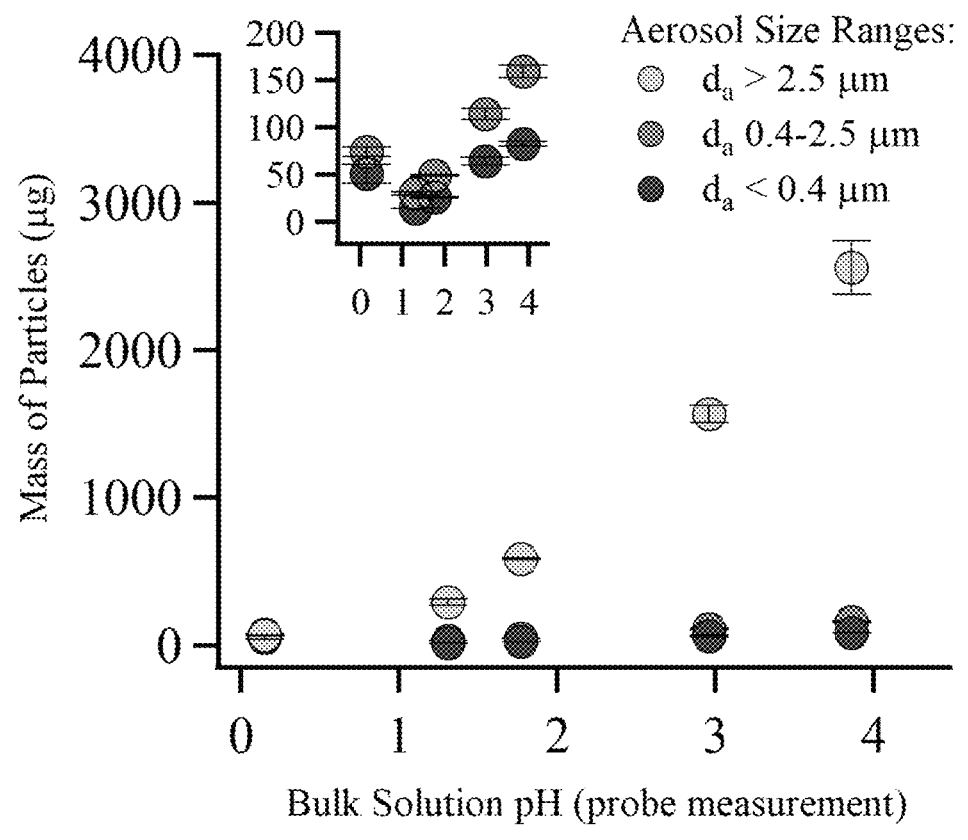

FIG. 10 depicts an example of a minimum mass of particles needed to induce a measurable color change on the pH indicator paper for each particle size range for particles generated from solutions of varying pH. Error bars represent uncertainty in the calculation of the mass of particles based on multiple measurements of the mass concentration size distribution. The inset focuses on smaller mass range for $d_a$ 0.4-2.5 μm and <0.4 μm particles.

FIGS. 11A-11E depict images of ambient aerosol collected on pH indicator paper UMBS ((A) and (B)) and UM Chemistry building (C) with the pH indicator paper scale and blank (D). (E) Estimated aerosol pH based on comparison of the images to the color scale for each ambient sample. Two color changes corresponding to pH 1.5 and pH 3 were observed for the UMBS 1<0.4 μm sample, although pH 3 was more predominant and a color change was not observed on the paper for the UM Chemistry<0.4 μm sample.

FIGS. 12A-12E depict Raman spectra normalized to the $\nu(HSO_4^-)$ mode for particles of various sizes generated from solution with pH ranging from 0.15 to 1.78.

Figure 13:
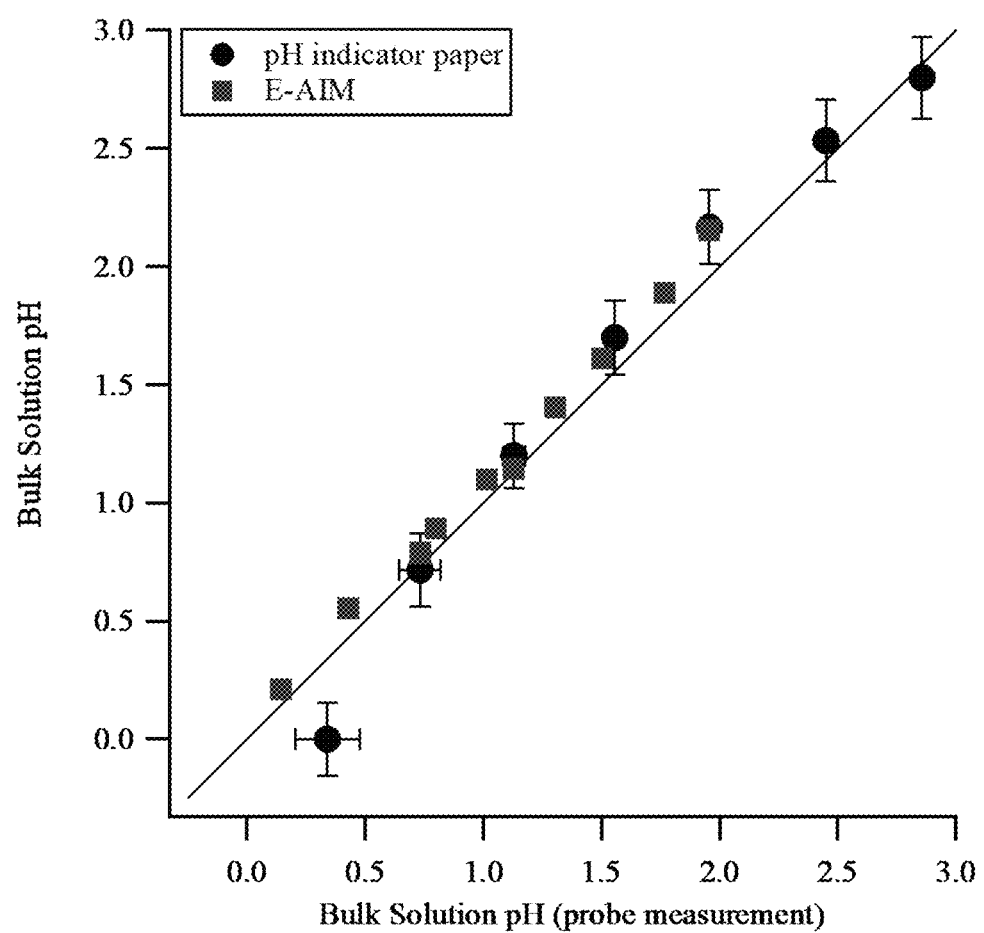
Figures 14A, 14B, 14C, 14D:
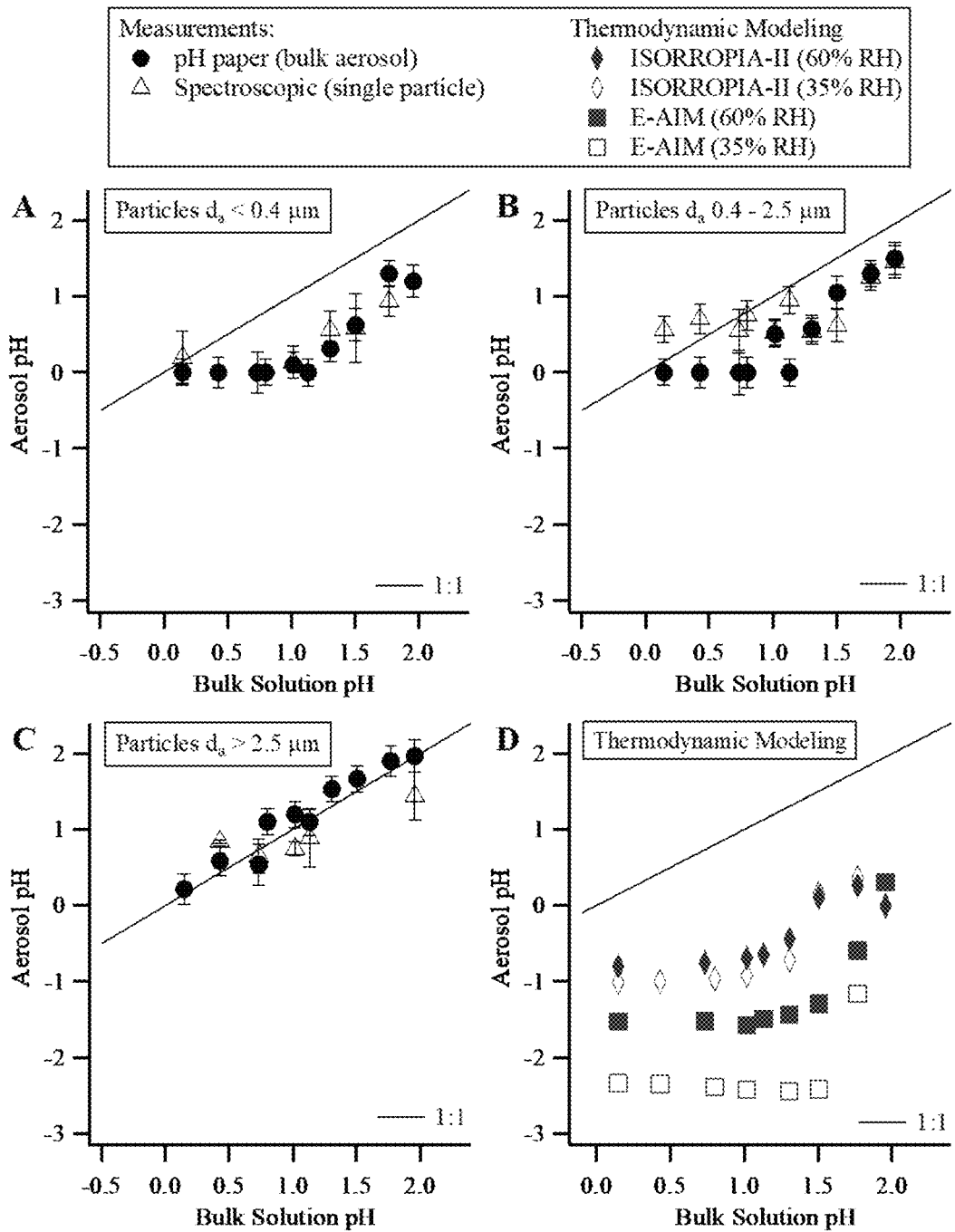

FIG. 13 depicts a comparison of pH indicator paper measurements and E-AIM calculated pH with pH probe measurements for the bulk solutions from which the aerosol particles were generated.

FIGS. 14A-14D depict examples of aerosol pH as a function of the pH of the bulk solution from which the particles were generated for particles (A) $d_a$<0.4 μm, (B) $d_a$ 0.4-2.5 μm, and (C) $d_a$>2.5 μm, as measured by the pH indicator paper and Raman microspectroscopic methods, and (D) calculated by E-AIM and ISORROPIA-II thermodynamic models. Error bars for the pH indicator paper data correspond to uncertainty in the measurements across multiple trials. Error bars for the Raman spectroscopic data corresponds to standard deviation of multiple trials. On all graphs, the solid black line represents 1:1.

While the disclosed devices and systems are representative of embodiments in various forms, specific embodiments are illustrated in the drawings (and are hereafter described), with the understanding that the disclosure is intended to be illustrative and is not intended to limit the claim scope to the specific embodiments described and illustrated herein.

DETAILED DESCRIPTION

Aerosol particles or aerosols may refer to a suspension of fine solid particles or liquid droplets in air or another gas. Aerosols may include natural or anthropogenic compositions such as sulfate from powerplants, dust, organic particles from fires and smoke, soot from combustion, biological particles, and haze from secondary organic or inorganic species, for example.

Atmospheric aerosol particles impact global climate and human health, making them an important system to examine. The pH of these particles is particularly important as it impacts the amount of aerosol that forms and its composition, as it alters the rates of chemical reactions occurring on or within the particle. However, no method currently exists to provide real-time measurement of particle pH, complicating our ability to know the pH of these particles, and thus, their impacts on climate and health.

Various non-limiting examples of improved methods, devices, and systems for colorimetric detection of ambient aerosols are disclosed herein to address these needs.

In certain examples, the methods, devices, and systems include direct measurement of size-resolved aerosol acidity from pH 0-4.5 using quantitative colorimetric image processing of digital images of $(NH_4)_2SO_4$—$H_2SO_4$ aqueous aerosol particles impacted onto pH-indicator paper. A trend of increasing aerosol acidity with decreasing particle size was observed that is consistent with spectroscopic measurements of individual particle pH. These results indicate the potential for direct measurements of size-resolved atmospheric aerosol acidity, which is needed to improve fundamental understanding of pH-dependent atmospheric processes, such as SOA formation.

These methods are advantageous as they do not require a UV-Vis spectrometer, and instead directly determine pH using easily available pH strips and a simple mobile device camera (e.g., a cellphone camera). This colorimetric method may be incorporated into a future time-resolved aerosol sampler that would impact aerosol particles onto a colorimetric pH sensitive tape. After collection of aerosols, an automated camera would take a picture, along with a color bar for calibration. The image would be processed and provide a value for pH. Relative humidity control may be required for this process. The time-sensitive nature of the image collection is key, as the method may require [H+] concentration, which will change if water is lost (or gained), meaning that image processing should be taken immediately after collection on the pH paper (when the pH paper is still wet). The desire to understand aerosol formation and concentrations from a scientific, regulatory, and environmental monitoring perspective have the potential to generate a commercial market for this unique method.

Facile methods for direct, quantitative, real-time measurement of size-resolved ensemble average (bulk) aerosol pH is provided. The methods include collecting aerosol particles on pH indicator paper, capturing an image of the altered pH indicator paper with a digital camera, and analyzing the captured digital image to determine the pH of the aerosol. The use of pH indicator paper to colorimetrically determine aerosol pH (e.g., acidity) is advantageous in eliminating the dependence on challenging particle composition measurements or isolation of specific acid/conjugate base species for direct pH measurement via Raman spectroscopy. While a limited number of studies have measured cloud and fog droplet acidity qualitatively with pH indicator paper method previously, this has not been explored quantitatively. The methods are disclosed in greater detail herein.

Collecting Aerosol Particles

A colorimetric pH sensitive surface may be provided for collecting aerosol particles. The colorimetric pH sensitive surface may include pH indicator paper or pH test strips. The pH sensitive surface or pH test strips may be configured for a segment of the overall pH range between 0 and 14 (e.g., a segment less than the overall pH range). As such, the sensitive surface may be configured to turn a different color when the pH of the sample is within the pH range of the sensitive surface (e.g., test strip). In certain examples, the pH indicator paper may be for pH 0-1.5, 0-2.0, 1.3-4.4, 2.5-4.5, 3.0-6.0, 5.0-9.0, or any other range. In certain examples, the pH indicator paper may be a for an acidic pH range, such as 0-2, 2.5-4.5, or 0-4.5.

The aerosol sample may be collected on the colorimetric pH sensitive surface using a single or multi-stage impactor, for example. In certain examples, the impactor is a multi-stage (e.g., cascade) impactor. Such a multi-stage impactor may be advantageous in allowing size-resolved aerosol acidity to be measured. Other methods of aerosol particle collection are also possible.

The aerosol sample to be analyzed may be any type of aerosol defined herein. For example, the aerosol may be an anthropogenic composition such as a particulate air pollutant composition. In certain examples, the aerosol particles include an ammonium sulfate-sulfuric acid (i.e., $(NH_4)_2SO_4$—$H_2SO_4$) composition. Other types of air pollutant compositions or aerosol particles are also possible.

The amount of aerosol collected on the surface for analysis is variable. In certain embodiments, the minimum amount of aerosol needed to be collected is the amount required to alter the color of the pH sensitive surface such that the pH of the aerosol may be determined.

Similarly, the amount of time for collection of the aerosol is also variable. In certain embodiments, the (e.g., maximum) amount of time required to collect the aerosol sample may be the minimum amount of time required to alter the color of the pH sensitive surface such that the pH of the aerosol may be determined. Alternatively, the time frame for aerosol collection may be based on a flow rate of the sample collection (e.g., within the impactor). In some examples, the time period for aerosol collection may be less than 1 minute, less than 5 minutes, less than 10 minutes, less than 15 minutes, less than 30 minutes, less than 60 minutes, or less than 120 minutes. In other examples, the time period for collection of the aerosol particles may be in a range of 0-5 minutes, 1-10 minutes, 1-15 minutes, 1-30 minutes, 1-60 minutes, 1-120 minutes, 5-60 minutes, or 10-30 minutes.

Certain atmospheric conditions for the aerosol collection may be targeted or fixed for the downstream analysis. For example, in certain examples, the relative humidity (RH) may be targeted or fixed at a specific percentage. In one example, the relative humidity during collection of the aerosol sample may be 90% RH.

As discussed in greater detail below, size-dependent trends in aerosol acidity were observed for $(NH_4)_2SO_4$—$H_2SO_4$ aerosol particles, with smaller particles having higher levels of acidity. This trend was confirmed with single particle pH measurements via the previously discussed spectroscopic method. Lastly, preliminary ambient atmospheric measurements with pH indicator paper are presented to demonstrate the field capabilities of this method.

$(NH_4)_2SO_4$—$H_2SO_4$ aerosol particles of varying pH may be generated and collected on pH indicator paper with a 3-stage impactor with aerodynamic size cuts of $d_a<0.4$ μm, $d_a$0.4-2.5 μm, and $d_a>2.5$ μm, enabling analysis of size-resolved aerosol pH. For systems pH<2, aerosol acidity may increase with decreasing particle size, due to ammonia partitioning below the $pK_a$ (1.99) of bisulfate and loss of water as surface area-to-volume ratios increased. Comparison with direct measurement of individual aerosol particle pH via a previously established spectroscopic method corroborated these results, as discussed below. The limit of detection for the pH indicator method in terms of particulate mass necessary for a measurable color change may show that on average ˜65 μg of particulate mass is needed for fine particles (<2.5 μm), while the mass for more dilute, larger particles increased with pH, requiring total particulate masses of ˜65 μg at pH 0 and ˜2.5 mg at pH 4.

Ambient measurements with sampling times of 2 hours or less may demonstrate the potential for atmospheric application of this method.

Capturing Image of pH Sensitive Surface with Digital Camera

Upon collection of an aerosol particle sample on the colorimetric pH sensitive surface, a digital image of the pH sensitive surface may be captured.

The digital image may be captured with a computing device, such as a mobile communication device (e.g., a mobile phone), or a tablet or other handheld computing device. In certain examples, the computing device may be a wearable electronic device, wherein the device may be worn on or attached to a person's body or clothing.

The digital image may be captured within a predefined time period following the collection of the aerosol particles on the pH sensitive surface. In certain examples, the predefined time period for capturing of the digital image may be defined as the time from removal of the pH sensitive surface (e.g., pH paper) from the impactor to the time the image is captured. It is advantageous to limit this time period so that the image is captured while the pH sensitive surface is still wet. If the pH paper has dried out following collection of the aerosol sample, it may be difficult to analyze the image and identify the pH of the aerosol.

In certain examples, the predefined time period following aerosol collection may be less than 1 minute, less than 5 minutes, less than 10 minutes, less than 15 minutes, less than 30 minutes, less than 60 minutes, or less than 120 minutes (e.g., following collection and removal of the sample from the impactor). In other examples, the predefined time period for capturing the digital image following collection of the aerosol particles may be in a range of 0-5 minutes, 1-10 minutes, 1-15 minutes, 1-30 minutes, 1-60 minutes, 1-120 minutes, 5-60 minutes, or 10-30 minutes (e.g., following collection and removal of the sample from the impactor).

In certain examples, a digital image of a plurality of color bars associated with defined pH values for the colorimetric pH sensitive surface may be captured as well. The color bars may be captured in a same digital image with the pH sensitive surface having the collected aerosol particles. In other examples, a separate digital image may be captured at a same time or within a certain time frame (and under similar conditions) as the digital image of the pH sensitive surface having the collected aerosol particles.

Analyzing Digital Image to Determine pH of Aerosol

The captured digital image with the collected aerosol particles may be analyzed by the computing device that captured the digital image, or the captured digital image may be transmitted over a connected network to a separate computing device for analysis.

A processor of the computing device may determine the pH of the aerosol through an analysis (e.g., visual analysis) of the captured image. In certain examples, the visual analysis may include separating the digital image into a plurality of sub-images associated with different color channels. A brightness of certain colors within associated sub-images may be used in the determination of the pH of the aerosol.

For example, digital images may be displayed as a combination of three primary colors; red, green, and blue. The way these colors are combined for display is determined by the brightness of each color ranging on a scale from 0 to 255. Thus, the digital image may be broken down into its individual color channels (e.g., red, green, and blue color channels).

When pH paper, which is essentially paper containing a pH sensitive indicator dye is has aqueous aerosol particles land on it, this paper will change the color based on the pH of those particles. Over atmospherically relevant pHs, the information on the color change retained in an image may be captured in the blue and green channels rather than the red channel. This was determined by separating an image of the pH color scale for the pH paper into its red, green, and blue channels. From those three sub-images, a linear relationship between the average brightness of the green and blue channels and pH could be established.

$$pH^2 \alpha \overline{G} - \overline{B} \qquad (1)$$

In other words, the processor may separate the digital image into a plurality of sub-images (e.g., including green and blue color channel sub-images) and then analyze the individual (e.g., green and blue) color channel sub-images to determine the brightness of the individual color (e.g., green and blue) sub-images. The difference in brightness between the (e.g., green and blue) sub-images may be used to determine the pH of the aerosol.

In certain examples, the brightness level of the sub-image may vary from region to region on the pH paper. In such an example, an average brightness level for a color channel may be determined, e.g., through an analysis or sampling of a plurality of regions of the pH paper. In an alternative example, a single brightness level for a color channel may be selected based on the location of the color change on the pH paper (e.g., a central area of the color changed pH paper may be selected for brightness level analysis).

In some examples, a different combination of color channel sub-images may be analyzed to determine the pH of the aerosol (e.g., red and blue, red and green).

In certain examples, a calibration curve is generated in order to determine the pH. The calibration curve may be generated using a plurality of samples with known pH levels. In certain examples, the image of the pH color scale can be used in conjunction with Equation 1 to generate a calibration curve. In other words, the calibration curve or linear regression may be generated by plotting pH from known pH samples in relation to the difference in brightness levels of the color channel sub-images from the visual analysis by the processor of the known pH samples.

This curve or linear regression may then be used to determine the pH of the area of pH paper impacted by aerosol particles, providing a (near) real-time, reproducible, and quantitative determination of size-resolved ensemble average or "bulk" aerosol particle pH. In other words, for a collected aerosol sample with an unknown pH level, the pH may identified through the analysis of the brightness levels of the color channel sub-images and then fit the result with the determined calibration curve.

In certain alternative examples, the digital image may be converted from RGB space to Intensity, Hue, Saturation (IHS) space in an effort to determine the pH in a similar manner as brightness level.

Furthermore, this digital image analysis may be adapted to other pH papers with different indicator dyes and using different relationships between the RGB channels.

Computing Devices

The computing device described above may be incorporated within an exemplary computing environment. The computing environment has sufficient computational capability and system memory to enable basic computational operations. In this example, the computing environment includes one or more processing unit(s), which may be individually or collectively referred to herein as a processor. The computing environment may also include one or more graphics processing units (GPUs). The processor and/or the GPU may include integrated memory and/or be in communication with system memory. The processor and/or the GPU may be a specialized microprocessor, such as a digital signal processor (DSP), a very long instruction word (VLIW) processor, or other microcontroller, or may be a general-purpose central processing unit (CPU) having one or more processing cores. The processor, the GPU, the system memory, and/or any other components of the computing environment may be packaged or otherwise integrated as a system on a chip (SoC), application-specific integrated circuit (ASIC), or other integrated circuit or system.

The computing environment may also include other components, such as, for example, a communications interface. One or more computer input devices (e.g., pointing devices, keyboards, audio input devices, video input devices, haptic input devices, or devices for receiving wired or wireless data transmissions) may be provided. The input devices may include one or more touch-sensitive surfaces, such as track pads. Various output devices, including touchscreen or touch-sensitive display(s), may also be provided. The output devices may include a variety of different audio output devices, video output devices, and/or devices for transmitting wired or wireless data transmissions.

The computing environment may also include a variety of computer readable media for storage of information such as computer-readable or computer-executable instructions, data structures, program modules, or other data. Computer readable media may be any available media accessible via storage devices and includes both volatile and nonvolatile media, whether in removable storage and/or non-removable storage. Computer readable media may include computer storage media and communication media. Computer storage media may include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which may be used to store the desired information, and which may be accessed by the processing units of the computing environment.

EXAMPLES

Standard solutions were prepared using 18.3 MΩ Milli-Q water and the following chemicals: ammonium sulfate $(NH_4)_2SO_4$ (Alfa Aesar) and sulfuric acid $(H_2SO_4)$ (Sigma-Aldrich). All chemicals were >98.0% purity and used without further purification. Solutions were 30 mM $(NH_4)_2SO_4$ with varying concentration of $H_2SO_4$ to control pH. Bulk solution pH values ranged from 0 to 5, as measured by a pH probe (AP110, accumet Portable). Aerosols were generated from solution using an atomizer operated with HEPA-filtered air and then impacted onto pH indicator paper (MColorpHast pH Test Strips, Millipore Sigma) and quartz substrates (Ted Pella, Inc.) using a microanalysis particle sampler (MPS-3, California Measurements, Inc.). The MPS-3 consists of three stages with aerodynamic diameter ($d_a$) 50% size cuts of 2.5-5.0 μm, 0.40-2.5 μm, and <0.40 μm for stages 1, 2, and 3, respectively. The chemical composition of the aerosol particles was chosen based on the ubiquity of sulfate in submicron atmospheric particles, which results in it being a common seed for SOA chambers study experiments. The pH range was chosen based on predictions of acidic aerosol particles from previous studies. Aerosol particles were not dried prior to impaction to ensure they were aqueous, and the RH of the system was maintained at ˜90%.

Aerosol pH for aqueous particles collected from each stage of the MPS on pH indicator paper was determined by colorimetric analysis of images collected immediately after sampling (see FIG. 1). pH indicator paper for the pH range 0-2.5 and 2.5-4.5 were used for this study. For the pH 0-2.5 paper, the indicator dye is thymol blue with a $pK_a$ of 1.7 and for the pH 2.5-4.5 paper, the indicator dye is methyl orange with a $pK_a$ of 3.47. An image of each sample, the corresponding pH color scale, and a blank pH indicator strip was collected with a standard cellular phone camera. The Red, Green, and Blue channels of the pH color scale were analyzed with a custom MATLAB script (Peterson, P. K., 2017. pH Paper Analysis. doi:10.5281/zenodo.1036797) created for this purpose to create a calibration curve relating the difference between the Green and Blue channels to pH.

The pH of the sample was then determined using the calibration curve. The pH color scale is included in each picture to generate a calibration curve for each sample analyzed to account for differences between images. Uncertainty for each pH measurement is also calculated based on color variation within the sample. pH indicator paper measurements of bulk solution standards of $(NH_4)_2SO_4$—$H_2SO_4$ of varying pH were compared to pH probe measurements to confirm the accuracy of the pH indicator paper and image processing method (FIG. 2). A correction factor was applied to all measurements made with the higher range pH paper due to a small, systematic bias with the pH 2.5-4.5 indicator paper and further information is provided in the Supporting Information (FIG. 3). To confirm the color change on the pH indicator paper was due to aerosol particles rather than gas or water vapor, a blank in which the particles were filtered out using a HEPA filter was collected and there was no observed color change on the pH indicator paper (FIGS. 4A-4C). To account for potential differences in measured pH between calibration reference solutions and inorganic ions common in atmospheric aerosols, a range of aqueous inorganic solutions were tested with both pH probe and pH indicator paper (FIG. 5).

For comparison to the bulk aerosol pH from the pH indicator paper, the pH of individual particles was also determined using the Raman microspectroscopic method described by Rindelaub et al. and Craig et al. pH is ultimately determined based on molality according to Equation 2. Details on the Raman analysis are disclosed in greater detail below.

$$pH=-\log(\alpha_{H^+})=-\log(\gamma_{H^+}*[H^+]) \quad (2)$$

Generated particles for each solution were also characterized by a scanning mobility particle sizer (SMPS, Model 3938, TSI Inc.) and aerodynamic particle sizer (APS, Model 3321, TSI Inc.). The SMPS was operated at a 10:1 sheath: aerosol flow ratio and provided mobility diameter ($d_m$) number and mass concentrations for the size range 14.1-763.5 nm. The APS provided aerodynamic diameter ($d_a$) number and mass concentrations for the size range 0.542-19.81 μm. Aerosols were studied under high (˜90%) and low (˜45%) RH conditions in order to determine the water content fraction for particles at 90% RH. For the low RH condition, aerosols passed through two diffusion dryers prior to analysis. RH was monitored with an RH sensor (EK-H5, Sensiron).

Ambient aerosol samples were also collected for pH indicator paper measurements using the MPS-3 impactor. Sampling was conducted at the University of Michigan Biological Station (UMBS) PROPHET Tower (Pellston, MI) in July 2016 and the University of Michigan Chemistry Building (Ann Arbor, MI) in August 2016.

Figures 6A, 6B, 6C:
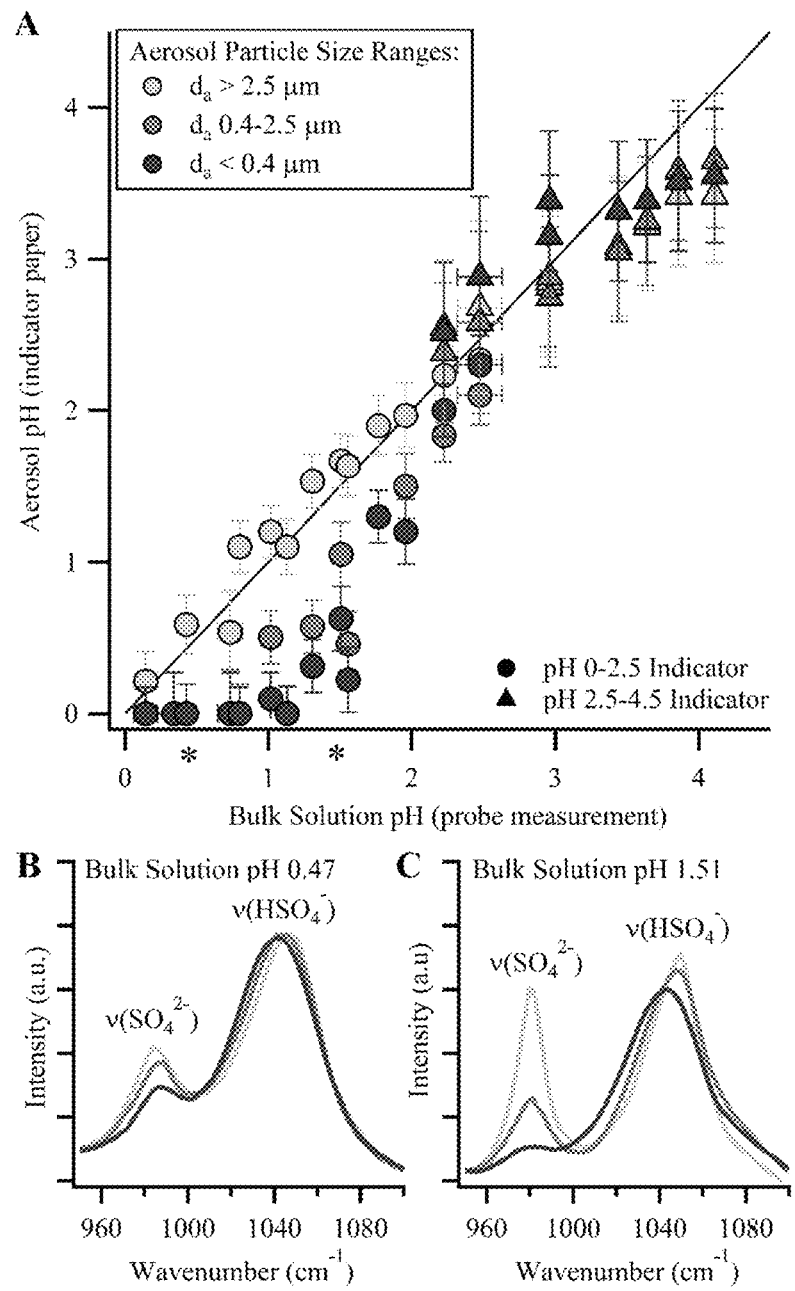
FIG. 6A depicts an example of pH indicator paper measurements of aerosol particles $d_a$>2.5 μm (yellow), $d_a$ 0.4-2.5 μm (orange), and $d_a$<0.4 μm (red) as a function of the bulk solution pH from which the particles were generated.
FIGS. 6B and 6C depict Raman spectra of the $\nu(SO_4^{2-})$ and $\nu(HSO_4^-)$ modes, normalized to the $\nu(HSO_4^-)$ mode, for particles generated from bulk solution (B) pH 0.47 and (C) pH 1.51 (corresponding data marked by the * in FIG. 6A).

Herein, the first direct, quantitative measurements of size-resolved aerosol pH were made using pH indicator paper. Aerosol particles were generated from $(NH_4)_2SO_4$—$H_2SO_4$ solutions (pH range 0-4.5) and impacted onto the pH indicator paper using a cascade impactor with three stages. Changes in aerosol acidity as a function of particle size were primarily observed at acidities below the $pK_a$ of $HSO_4^-$ (1.99), as shown in FIGS. 6A-6C. For aerosols generated from solutions with pH<2.5, the aerosol pH of the coarse mode particles ($d_a$>2.5 μm) was similar to the bulk solutions. In contrast, below a pH of 2.5, fine mode aerosol ($d_a$ 0.4-2.5 μm) pH was lower than the bulk solution and coarse mode particles. Aerosol pH of the smallest sized particles ($d_a$<0.4 μm) was even lower, indicating particle acidity increases (pH decreases) with decreasing particle size. It should be noted that the minimum pH value calculated with the pH indicator paper method is pH 0 (the lowest value on the pH scale range for the pH 0-2.5 indicator paper), and thus represents an upper bound of pH for samples generated from solutions with pH≤1. The increasing acidity of smaller particles is likely related to aerosol water content and ammonia partitioning below the $pK_a$ of bisulfate and is discussed in detail below.

Raman spectra collected from aerosol particles of various sizes corresponding to the pH paper measurement size ranges confirmed the observation of increased particle acidity with decreasing particle size (FIGS. 6B and 6C). As shown in Rindelaub et al. and Craig et al., the $v_s(SO_4^{2-})$ and $v_s(HSO_4^-)$ vibrational modes can be used to determine aerosol particle pH based on the $HSO_4^-/SO_4^{2-}$ acid-base equilibrium. For spectra normalized to the intensity of the $v(HSO_4^-)$ mode, a clear decrease in the intensity of the $v(SO_4^{2-})$ mode, indicating increasing acidity (decreasing pH), is observed with decreasing particle size across all bulk solution pH systems. Raman spectra for the other systems between pH 0.15-2.05, the pH range for which aerosol particle pH can be determined spectroscopically for the $HSO_4^-/SO_4^{2-}$ equilibrium, is disclosed herein (see FIG. 5).

Figures 7A, 7B:
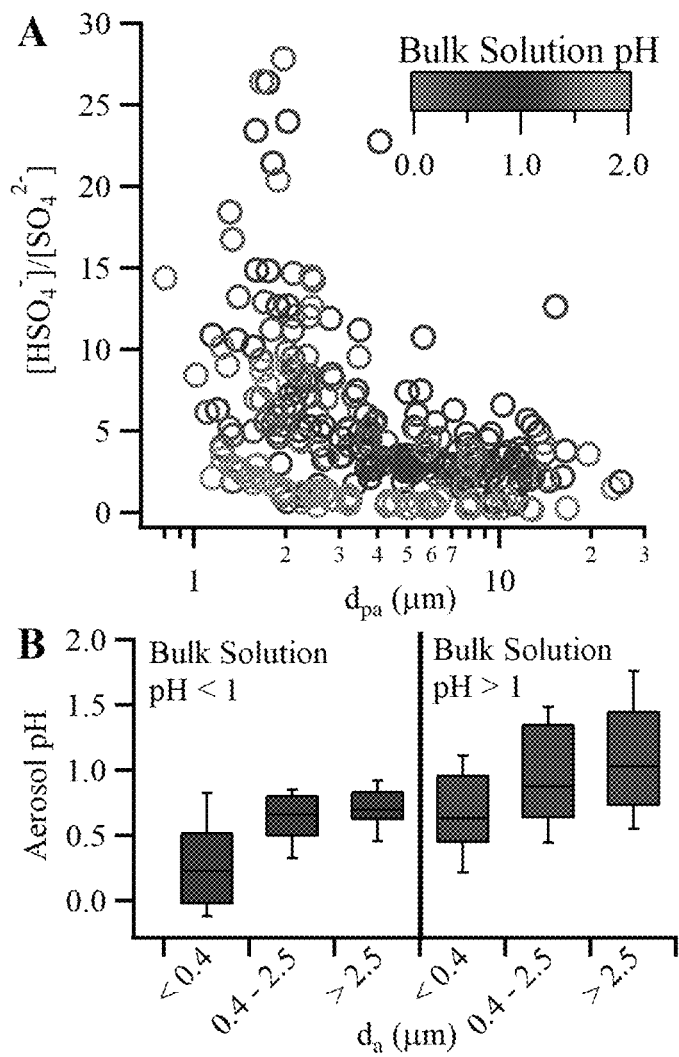
FIG. 7A depicts $[HSO_4^-]/[SO_4^{2-}]$ as a function of $d_{pa}$ for individual aerosol particles, with color representing the pH of the solution from which the particles were generated.
FIG. 7B depicts a box and whisker plot of aerosol pH as a function of $d_a$ for individual particles but grouped into size ranges corresponding to the pH indicator paper measurements, wherein the centerline represents the median, the box outlines the inner quartiles, and the whiskers represent the $10^{th}$ and $90^{th}$ percentiles.

To further investigate the relationship between particle size and acidity, individual aerosol particle pH was determined spectroscopically for particles generated from bulk solution of pH 0.15 to pH 2.05. As shown in FIGS. 7A and 7B, the single particle spectroscopic pH measurements corroborate the aerosol pH indicator paper measurements. Particles generated from bulk solutions of lower pH had higher acidity levels, as expected, and across all bulk solution pH systems, the $[HSO_4^-]/[SO_4^{2-}]$ ratio is higher and more varied for smaller sized particles, indicating higher levels of acidity and decreased uniformity within the aerosol population. When clustered according to the size ranges corresponding to the pH indicator paper measurements, increasing acidity with decreasing particle size can be clearly seen for systems both pH<1 and pH>1. As the pH indicator paper particle size ranges from inertial separation are based on aerodynamic diameter ($d_a$) rather than projected area diameter ($d_{pa}$), the measured $d_{pa}$ of the individual particles analyzed by Raman was converted to $d_a$ prior to clustering based on a spreading ratio of 4. For bulk solution systems pH<1, particles with aerodynamic diameter<0.4 μm, 0.4-2.5 μm, and >2.5 μm had median pH values of 0.23, 0.66, and 0.69, respectively. For bulk solution systems pH>1, particles with aerodynamic diameter<0.4 μm, 0.4-2.5 μm, and >2.5 μm had median pH values of 0.63, 0.87, and 1.03, respectively. Considering the log scale of $[H^+]$ for pH, these differences of ~0.5 pH units correspond to a 3× increase in $H^+$ concentration as particle size decreases from supermicron to submicron for aerosol particles of the same population.

The observed trend of increasing particle acidity with decreasing particle size for systems where pH<2.5 is attributed to ammonia partitioning and water loss. Below the $pK_a$ of bisulfate, loss of $NH_4^+{}_{(aq)}$ to $NH_{3(g)}$ partitioning leaves less $NH_4^+{}_{(aq)}$ present in the particle phase to neutralize sulfate species (see Eq. 2 below). Although the smallest particle size range classified is <0.4 μm, the example number concentration size distribution (see FIG. 8) shows that particles<0.10 μm where $NH_{3(g)}$ volatilization would most likely occur are present. Though direct measurements of $NH_{3(g)}$ and quantified $NH_4^+{}_{(aq)}$ were not available, this equilibrium likely plays a role and will be explored in future work.

$$SO_4^{2-}(aq)+NH_4^+(aq) \rightarrow HSO_4^-(aq)+NH_3(g) \qquad (2)$$

Increased surface area-to-volume ratios for smaller particles compared to larger particles allows for greater loss of water and potential $NH_3$ diffusion from the particle to gas phase. With a lower water content, the molar concentration of chemical species (e.g. $H^+$) increases. Thus, in smaller sized particles $[H^+]$ increases and pH decreases. Water content fraction by mass for each size range of particles for several pH systems was calculated based on comparison of mass concentration size distributions at wet and dry RH conditions. More details on the water content fraction calculation are provided in the Supporting Information. Increasing water content fraction was observed with increasing pH, as well as with increasing particle size, across all pH levels (see Table 1 below).

TABLE 1

Minimum particle mass, water content fraction, and average particle density for particles of various sizes for a range of pH systems.

| | | Bulk Solution pH | | | | |
|---|---|---|---|---|---|---|
| | | 0.15 | 1.31 | 1.77 | 2.96 | 3.86 |
| Particles $d_a$ < 0.4 μm | Mass (μg) | 50 ± 10 | 14.5 ± 0.2 | 25.6 ± 0.5 | 64 ± 4 | 83 ± 2 |
| | Water Content Fraction | 0.6 ± 0.2 | 0.81 ± 0.02 | 0.78 ± 0.03 | 0.80 ± 0.08 | 0.79 ± 0.03 |
| | Average Particle Density (kg/m³) | 1041 ± 2 | 1057 ± 4 | 1048 ± 4 | — | — |

TABLE 1-continued

Minimum particle mass, water content fraction, and average particle density for particles of various sizes for a range of pH systems.

| | | Bulk Solution pH | | | | |
|---|---|---|---|---|---|---|
| | | 0.15 | 1.31 | 1.77 | 2.96 | 3.86 |
| Particles $d_a$ 0.4 μm-2.5 μm | Mass (μg) | 74 ± 5 | 30 ± 1 | 49 ± 1 | 115 ± 6. | 159 ± 7 |
| | Water Content Fraction | 0.75 ± 0.09 | 0.730 ± 0.06 | 0.69 ± 0.06 | 0.69 ± 0.08 | 0.73 ± 0.06 |
| | Average Particle Density (kg/m³) | 1017 ± 2 | 1041 ± 4 | 1034 ± 3 | — | — |
| Particles $d_a$ > 2.5 μm | Mass (μg) | 67 ± 1 | 300 ± 20 | 584 ± 7 | 1570 ± 60 | 2600 ± 200 |
| | Water Content Fraction | 0.63 ± 0.07 | 0.99 ± 0.09 | 1.00 ± 0.02 | 1.00 ± 0.05 | 1.0 ± 0.1 |
| | Average Particle Density (kg/m³) | 1019 ± 1 | 1025 ± 4 | 1022.9 ± 2.1 | — | — |

Particle density, calculated as part of the Raman spectroscopic method to determine pH, corroborated the water content fraction results, as particle density increased with decreasing particle size (see Table 1). These observations of water content fraction and particle density support the hypothesis that smaller particles contain less water and have higher concentrations of chemical species, leading to measured lower pH values. Both loss of $NH_4^+{}_{(aq)}$ due to $NH_{3(g)}$ partitioning and water loss lead to solutions that are no longer thermodynamically ideal water droplets with higher ionic strengths and higher levels of acidity.

This trend of increasing particle acidity with decreasing particle size has been indirectly observed for ambient aerosol previously. The pH of coarse mode aerosol was reported to be higher than fine mode aerosol for several different particle types, including sea salt aerosol particles, fog and cloud droplets, and urban aerosol particles. For these observations, aerosol pH was determined via extrapolation of pH measurements of diluted samples, ion balance, thermodynamic modeling, or a qualitative pH paper method. Several hypotheses were proposed to explain the observed differences in acidity, including differing rates of HCl volatilization, dilution by condensation, differing rates of neutralization, and size-dependent neutralization by mineral cations or gas-phase $NH_3$. Given the complex nature of aerosol particles in terms of chemical composition and atmospheric conditions, it is likely that there are many factors that influence aerosol acidity with regards to particle size and further studies are needed to elucidate the potential mechanisms driving this phenomenon.

Direct comparison of aerosol pH from pH indicator paper and single particle pH from Raman microspectroscopy is presented in FIGS. 9A-9C. The Raman measurements represent the average pH for individual particles analyzed within each size range (converted from $d_{pa}$ to $d_a$), with error bars indicating standard deviation. There is good agreement between the two methods across all size ranges. The largest deviation between the two methods is observed for particles generated from solution pH<1.5 for the $d_a$ 0.4-2.5 μm size range, with the Raman spectroscopically determined pH values ~0.5 pH units higher than the pH indicator paper determined pH values. This is most likely due to a limitation of the Raman spectroscopic method, as when one of the species in the bisulfate-sulfate equilibrium is more dominant, it is more difficult to accurately measure both vibrational modes. It should also be noted that the pH values plateau ~pH 0 for particle size ranges $d_a$<0.4 μm and $d_a$ 0.4-2.5 μm because both methods have a lower limit of ~pH 0. A comparison of pH indicator paper and Raman microspectroscopic aerosol pH measurements to model predicted aerosol pH is disclosed herein.

To investigate the detection limit of the pH indicator paper method, the minimum mass of particles needed to induce a quantifiable color change on the indicator paper for each size range was determined (see FIG. 10). The mass of particles impacted for each size range was calculated by integrating the area under the curve for mass concentration size distributions collected via SMPS and APS. The minimum mass required was determined by decreasing sampling time until a color change on the pH indicator paper was no longer distinguishable optically, both visually and by image processing script. RH, and consequently, aerosol liquid water content, plays an important role in how much particulate mass is required, as water is needed for the dye in the indicator paper to change and diffuse through the paper enough to be visible.

For $(NH_4)_2SO_4$—$H_2SO_4$ particles for most size ranges and pH conditions at RH 90%, on average based on these measurements, ~65 μg of aerosol mass is sufficient for an accurate aerosol pH measurement. As particle pH increases, the necessary mass of particles also increases, since $[H^+]$ becomes more dilute. The smaller particle sizes of the lowest pH system (pH 0.15) are the exception to this trend, most likely due to lower water content fraction (see Table 1), which requires a larger mass of particles for sufficient liquid water to induce a color change on the pH indicator paper. Concurrently, the larger sized particle range requires significantly more particulate mass, as both the mass and water content fraction of the larger particles is much greater than for those of the smaller sized particles. Specific mass values are provided in Table 1. It should be noted that under lower RH conditions, it is likely that greater particle mass will be necessary for pH indicator paper measurements, as the aerosol liquid water content will be lower. Future work will thoroughly investigate the limitations with respect to aerosol water content and RH for the pH indicator paper method of measuring aerosol pH.

To demonstrate the potential for ambient sampling with this method, as well as to illustrate some potential challenges, ambient aerosol particle samples were collected at two locations—the UMBS near Pellston, MI and outside the University of Michigan Chemistry Building in Ann Arbor, MI, as shown in FIGS. 11A-11E.

As discussed herein, the pH of solutions of varying inorganic ion composition was successfully measured with pH indicator paper, thus indicating this method could also be applied to measure the pH of ambient aerosol particles of varying chemical composition. Ambient RH was ~70%, 80%, and 60% at the time of sampling for the UMBS 1, UMBS2, and UM Chemistry samples, respectively. Ambient samples were collected for ~1-2 hours, demonstrating that pH indicator paper method can be run rapidly enough for semi-continuous measurements. For samples from both locations, aerosol acidity was primarily estimated to be ~pH 3-3.5 across the particle sizes measured. One sample from UMBS (FIG. 11A) indicated that the smallest particles were more acidic (pH~1.5), though the color change was not uniform across the samples and other portions of the paper had pH close to 3. pH could only be qualitatively determined from visual inspection for these samples, as the pH indicator paper used for sampling was not compatible with the MAT-LAB script for more quantitative analysis.

Figure 1:
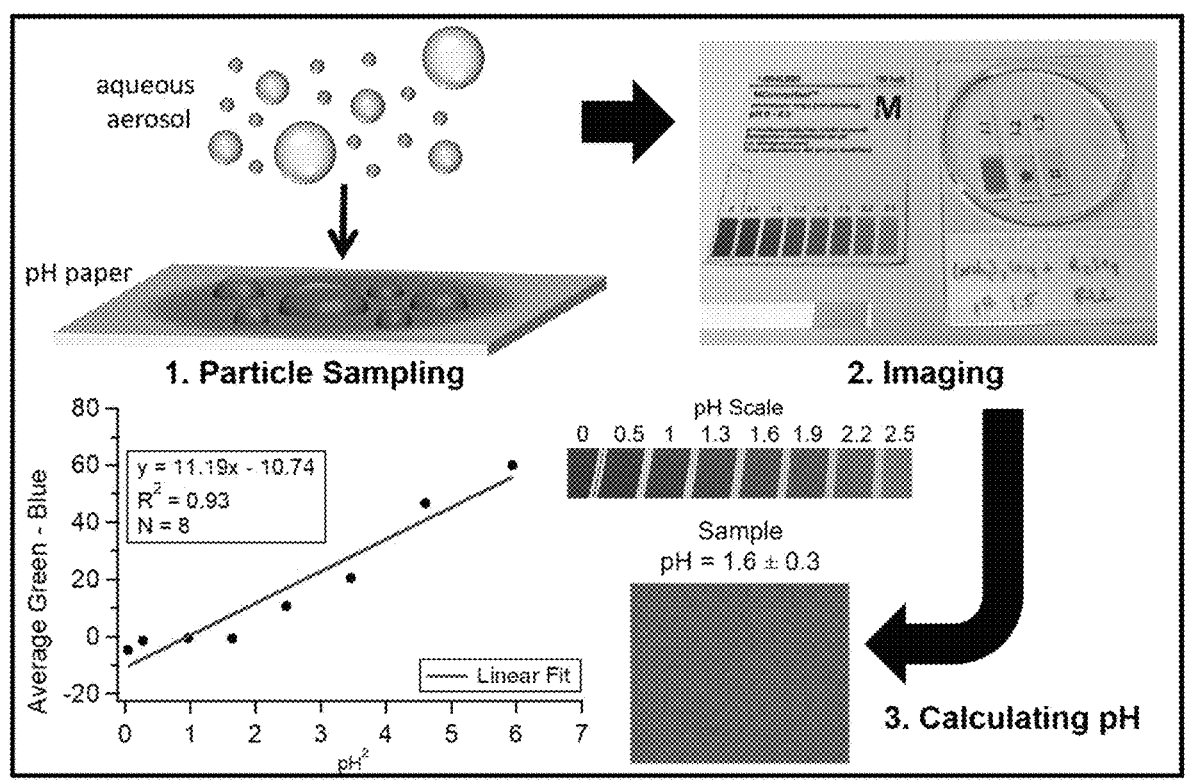
FIG. 1 depicts an exemplary schematic of a pH indicator paper method for direct measurement of aerosol pH.
Figure 2:
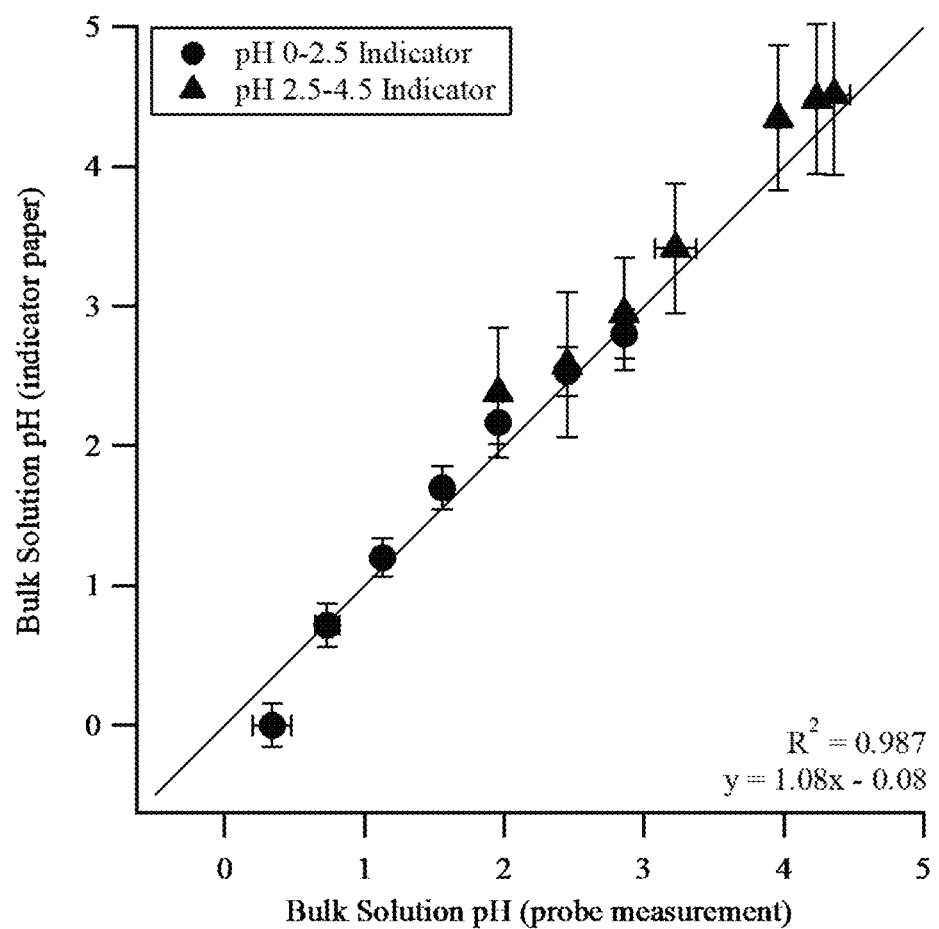
FIG. 2 depicts an example of a bulk solution pH as determined by pH indicator paper measurements in comparison to bulk solution pH measured by a pH probe. The solid line represents a 1:1 ratio.

However, the ambient aerosol pH measurements agree with the pH measurements of the laboratory-generated particles of this study, as aerosol particles with lower acidity levels (~pH 3-3.5) showed minimal difference in measured pH with regards to particle size. While the images of these ambient samples show they primarily contained non-colored chemical species, the large area of the pH indicator paper that changed color around the center where aerosol particles were impacted shows the potential for pH analysis of ambient samples that may have slight discoloration at the impaction center from colored chemical species, such as black carbon and dust. These preliminary results demonstrate the potential for ambient measurement; however, it should be noted that further testing with precisely controlled RH and aerosol water content are needed to utilize the pH indicator paper method quantitatively for ambient studies.

pH Measurements of $(NH_4)_2SO_4$—$H_2SO_4$ Standard Solutions pH indicator paper measurements of bulk solution standards of (NH4)2SO4-H2SO4 of varying pH were compared to pH probe measurements to confirm the accuracy of the pH indicator paper method (see FIG. 2). Good agreement was observed between the two pH measurement techniques. The pH indicator paper measurements showed slight deviation when approaching the limits of each paper's respective pH range, due to the $pK_a$ values of the indicator dye in the paper. For the pH 0-2.5 paper, the indicator dye is thymol blue with a $pK_a$ of 1.7 and for the pH 2.5-4.5 paper, the indicator dye is methyl orange with a $pK_a$ of 3.47. At pH values at the limits of the indicator range, the dye is less effective, leading to pH measurements that may be slightly less accurate. Overall, the pH indicator paper measurements were both accurate and precise through multiple trials with each solution.

Figure 3:
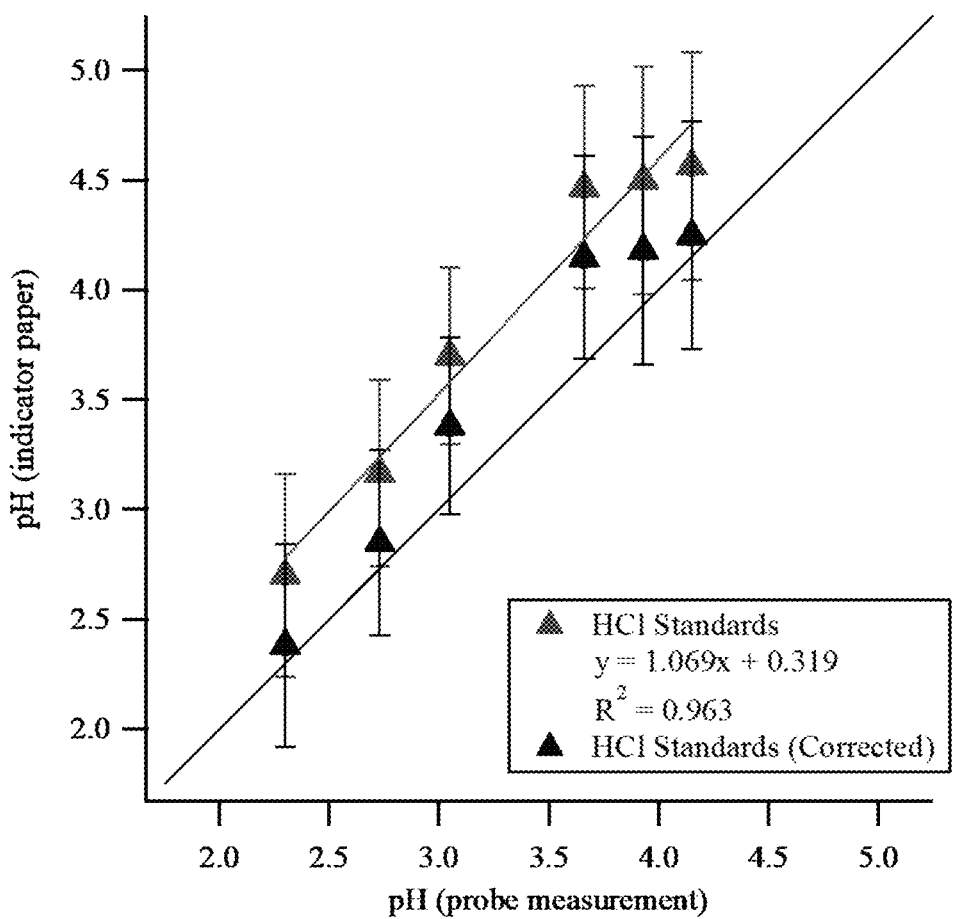
FIG. 3 depicts an example of bulk solution pH measurements via pH 2.5-4.5 indicator paper as a function of bulk solution pH measurements via pH probe for HCl standard solutions.

Correction Factor for pH Measurements with pH 2.5-4.5 Indicator Paper pH measurements made with the pH 2.5-4.5 indicator paper showed a bias for consistently underestimating pH for the $(NH_4)_2SO_4$—$H_2SO_4$ solutions as well as hydrochloric acid (HCl) standard solutions (FIG. 3). The pH measurements for the HCl standards were fitted with a linear regression and a correction factor offsetting the y-intercept of the regression was applied, bringing the pH measurements into good agreement with the pH measurements via probe analysis. The y-intercept correction factor of -0.319 was applied to all subsequent pH measurements with the pH 2.5-4.5 indicator paper.

Blank Aerosol Testing with pH Indicator Paper

Figures 4A, 4B, 4C:
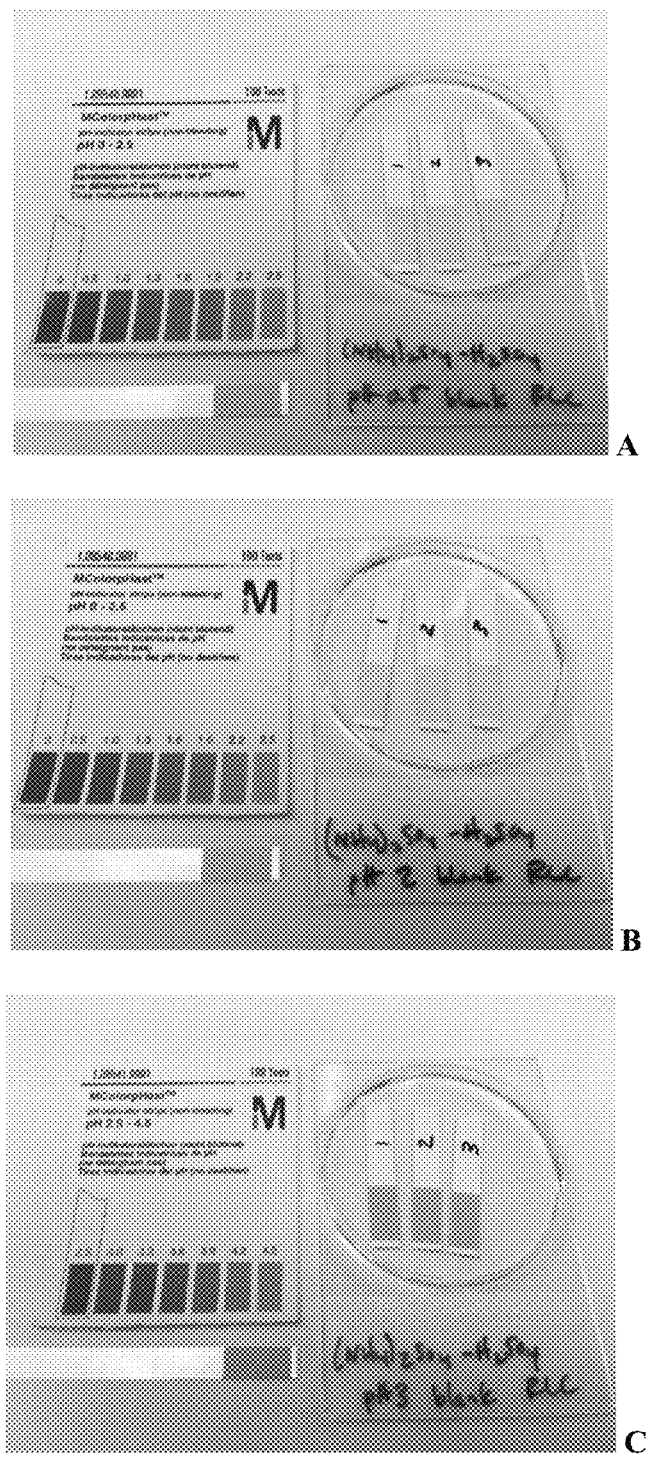
FIGS. 4A-4C depicts images of pH 0.5, 2, 3 systems (respectively) tested with aerosol particles filtered out to determine influence of gases and/or water vapor on pH indicator paper color changes.

To confirm the color change on the pH indicator paper was due to aerosol particles rather than gas or water vapor, an aerosol blank in which the particles were filtered out using a HEPA filter was collected and there was no observed color change on the pH indicator paper (FIG. 4). pH 0.5, 2, and 3 systems were tested.

pH Indicator Paper Testing with Various Aqueous Inorganic Ion Systems

Figure 5:
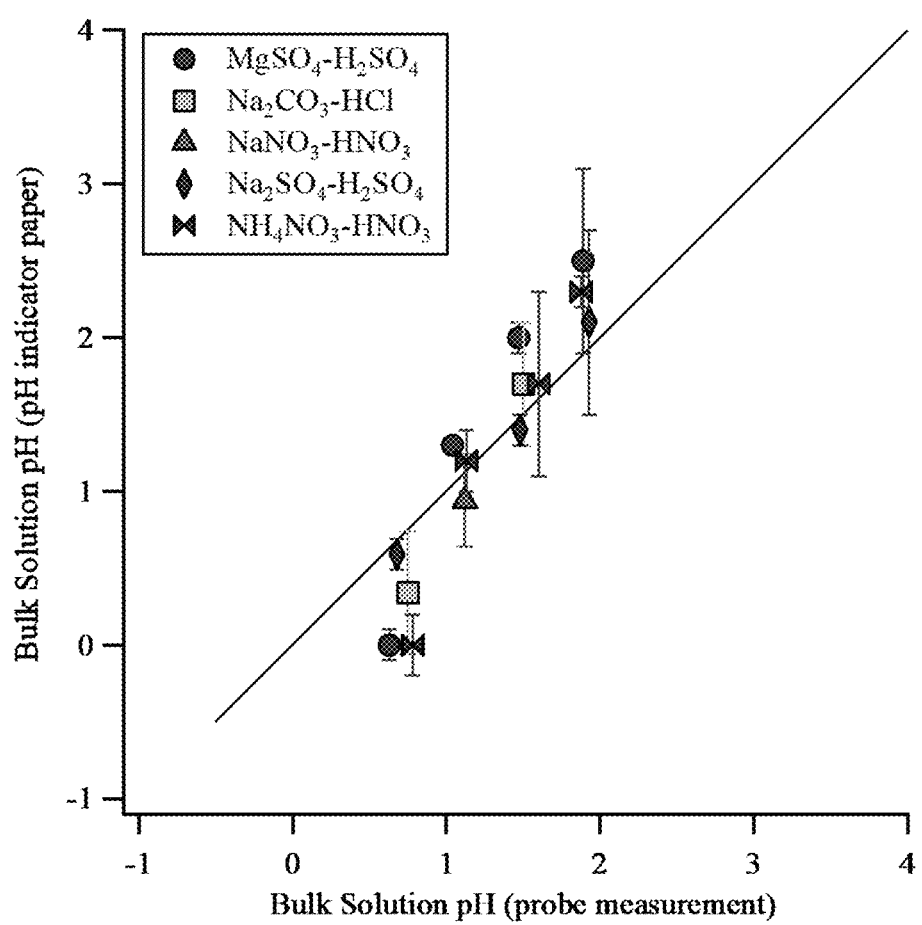
FIG. 5 depicts an example of a bulk solution pH as measured by pH indicator paper compared to bulk solution pH as measured by pH probe for systems of various inorganic ion composition.

Systems of varying inorganic ion composition and pH were also tested with the pH 0-2.5 indicator paper to confirm its accuracy and applicability to a range of chemical compositions common in atmospheric aerosol particles (FIG. 5). Aerosol particle chemical compositions included $MgSO_4$—$H_2SO_4$, $Na_2SO_4$—$H_2SO_4$, $Na_2CO_3$—$HCl$, $NaNO_3$—$HNO_3$, and $NH_4NO_3$—$HNO_3$.

Raman Analysis

Raman spectra for individual impacted particles were collected using a LabRAM HR Evolution Raman microspectrometer (Horiba, Ltd.) equipped with a Nd:YAG laser source (50 mW, 532 nm) and CCD detector, and coupled with a confocal optical microscope (100×0.9 N.A. SLMPlan N Olympus objective). The instrument was calibrated against the Stokes Raman signal of pure Si at 520 $cm^{-1}$ using a silicon wafer standard. Spectra from 500 to 1400 $cm^{-1}$ were acquired for 15 s with three accumulations. A 600 groove/mm diffraction grating yielded spectral resolution of ~1.7 $cm^{-1}$. Although particles were generated and impacted at 90% RH, spectra were collected at ambient temperature and RH (~35% or ~60%). Though the aerodynamic diameter for particles collected on the smallest stage (<0.4 μm) is below the typical detectable particle size due to the diffraction limit of visible light and the 532 nm laser for the 100× objective, aqueous particles spread when impacted, causing a larger projected area diameter, which can be observed with typical spreading ratios.

Raman Spectra for Small, Medium, and Large Particle Sizes Under Various pH Conditions Raman spectra were collected for aerosol particles of various sizes corresponding to the pH indicator paper measurement size ranges to further investigate the trend of increasing particle acidity with decreasing particle size. FIGS. 12A-12E show spectra normalized to the $\nu(HSO_4^-)$ mode for the pH 0.15, pH 0.80, pH 1.01, pH 1.31, and pH 1.78 systems.

Representative Number Concentration Size Distribution

Figure 8:
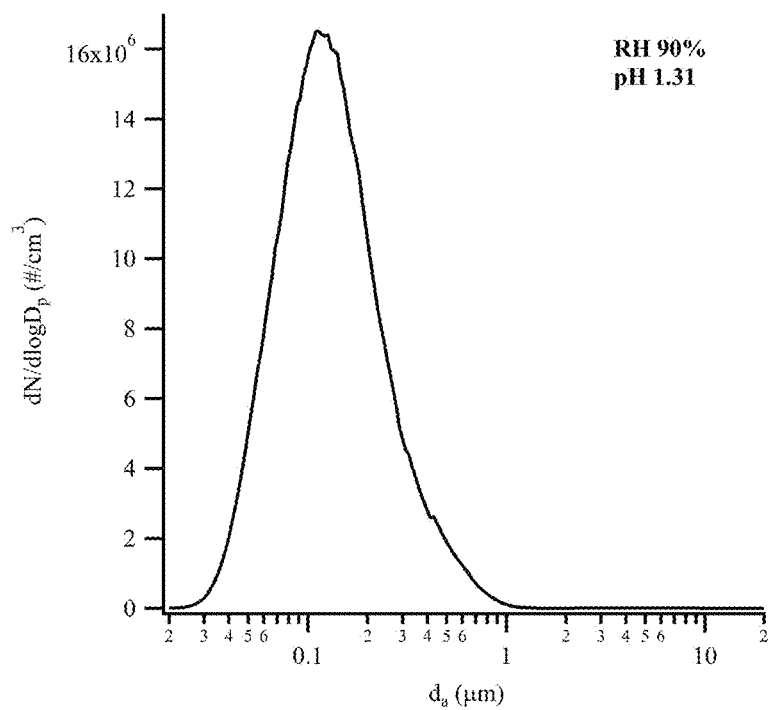
FIG. 8 depicts a number concentration size distribution for the pH 1.31 system at 90% RH, with a mode at 113 nm.

Number concentration size distributions were collected with SMPS and APS for each pH system. A representative number concentration size distribution is provided in FIG. 8, showing that particles<100 nm are present, therefore $NH_{3(g)}$ volatilization, and thus loss of $NH_4^+_{(aq)}$ in the particle, is a potential mechanism leading to increased acidity for smaller sized particles.

Water Content Fraction and Particle Mass Limit Calculations

Water content fraction by mass for each size range of particles for several pH systems was calculated based on comparison of mass concentration size distributions at wet and dry RH conditions. Particle mass from the mass concentration size distribution was summed for all bins within a given particle size range for a wet and then dry RH condition. Then water content fraction was calculated by dividing the difference between wet and dry condition masses ($m_{wet}$ and $m_{dry}$, respectively) by the wet condition mass, according to Equation 3.

$$\text{Water content fraction} = \frac{(m_{wet} - m_{dry})}{m_{wet}} \quad (3)$$

Water content fraction values, along with minimum particle mass needed to induce a measureable color change and average particle density, for several pH systems is provided in Table 1. Minimum particle mass was calculated by again summing the mass from mass concentration size distributions for all bins within a given particle size range and then multiplying by sampling time to determine total mass of particles impacted.

Thermodynamic Modeling

Thermodynamic models commonly used to predict aerosol acidity, such as E-AIM II[3-6] and ISORROPIA-II[7,8] use model inputs of temperature, RH, and chemical concentrations such as ammonium and sulfate. However, bisulfate concentrations—like those measured here—cannot be input independently into the models. If spectroscopically measured sulfate ($SO_4^{2-}$) and bisulfate ($HSO_4^-$) concentrations are combined and used as the nominal sulfate concentration input, an ion balance needed to run E-AIM would lead to erroneously high values of the input $H^+$ concentration. The users' input conditions may lead to an over-prediction in acidity when running the model. Indeed, FIGS. 14A-14D show that when run in this manner, both models over predicted aerosol acidity, resulting in pH values ~1-2.5 pH units lower than the direct aerosol pH measurements. Again, this is most likely due to the challenges of accurately representing bisulfate and, possibly, in distinguishing between free and bound protons ($H^+$ vs $HSO_4^-$) within the model. These results illustrate the benefit of direct measurements of aerosol pH, at both the bulk and single particle level, to compare to and help constrain model predictions. Details on how the models were run and additional assumptions model are provided below for each model. Both models resulted in molality-based pH, though E-AIM was initially mole fraction based, but converted to molality.

E-AIM: E-AIM Model II (http://www.aim.env.uea.ac.uk/aim/aim.php) was used to determine bulk solution pH as well as aerosol pH for individual particles for each pH system. For bulk solution pH, model inputs included concentration of $SO_4^{2-}$, $NH_4^+$, and $H^+$. For aerosol pH, model inputs included temperature, relative humidity, and concentration of $SO_4^{2-}$, $NH4^+$, and $H^+$. [$SO_4^{2-}$] was determined by combining spectroscopically measured concentrations of $SO_4^{2-}$ and $HSO_4^-$. The ratio of [$NH_4^+$] to ([$SO_4^{2-}$]+[$HSO_4^{2-}$]) in each bulk solution was used to determine [$NH_4^+$] in the particles based on the measured [$SO_4^{2-}$] and [$HSO_4^{2-}$], in the same manner as Rindelaub et al. and Craig et al. The [$H^+$] input was determined from an ion balance with [$SO_4^{2-}$] and [$NH_4^+$]. Formation of all solids was prevented for each calculation. Relative humidity was either 35% or 65%, corresponding to the relative humidity conditions during which Raman spectra were collected. pH was then calculated from model determined [$H^+_{(aq)}$] (m) and activity coefficient according to Equation 4 (FIGS. 13 and 14A-14D).

$$pH = -\log([H^+] * \gamma_{H^+}) \quad (4)$$

ISORROPIA-II: ISORROPIA-II (http://nenes.eas.gatech.edu/ISORROPIA) was also used to determine aerosol pH for individual particles for each pH system. Model inputs included temperature, relative humidity, and concentration of $SO_4^{2-}$ and $NH_4^+$. Similar to the concentration inputs for E-AIM, [$SO_4^{2-}$] was determined by combining spectroscopically measured concentrations of $SO_4^{2-}$ and $HSO_4^-$. The ratio of [$NH_4^+$] to ([$SO_4^{2-}$]+[$HSO_4^{2-}$]) in each bulk solution was used to determine [$NH_4^+$] in the particles based on the measured [$SO_4^{2-}$] and [$HSO_4^{2-}$]. Relative humidity was either 35% or 65%, corresponding to the relative humidity conditions during which Raman spectra were collected. Certainly, the model predictions are more accurate when inputs of both aerosol and gas phase chemical species are included. However, with only aerosol phase concentration measurements, ISORROPIA-II was run in the reverse mode and to prevent precipitation of salts, the metastable state was specified. pH was calculated directly by the model (FIGS. 14A-14D). In particular, differences between the ISORROPIA-II model and measurements shown here may be attributable to differences in the [$HSO_4^-_{(aq)}$] and [$SO_4^{2-}_{(aq)}$] ratios.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

What is claimed is:

1. A method for determining a pH of an ambient aerosol, the method comprising:
   collecting the ambient aerosol on a colorimetric pH sensitive surface;
   capturing, using a camera, a digital image of the colorimetric pH sensitive surface within a predefined period of time following the collecting of the ambient aerosol;
   separating, by a processor, the digital image into a plurality of individual color channel sub-images;
   identifying, by the processor, a brightness level of a first color channel sub-image and a brightness level of a second color channel sub-image; and
   ascertaining, by the processor, the pH of the ambient aerosol based on a subtraction of the brightness level of the first color channel sub-image from the brightness level of the second color channel sub-image.

2. The method of claim 1, wherein the first color channel sub-image is a green color channel sub-image, and
   wherein the second color channel sub-image is a blue color channel sub-image.

3. The method of claim 2, wherein the determining further comprises:
   developing a calibration curve, by the processor, from a plurality of samples with known pH levels, wherein a linear regression is established between pH and differences between brightness levels of green color channel sub-images and brightness levels of blue color channel sub-images,
   wherein the pH of the ambient aerosol is ascertained using the calibration curve.

4. The method of claim 3, further comprising:
   capturing, using the camera, a plurality of color bars that identify a plurality of pH levels within a pH range of the colorimetric pH sensitive surface.

5. The method of claim 1, wherein the capturing of the digital image includes capturing a plurality of color bars that identify a plurality of pH levels within a pH range associated with the colorimetric pH sensitive surface.

6. The method of claim 5, further comprising:
developing a calibration curve, by the processor, from a plurality of samples with known pH levels.

7. The method of claim 6, wherein the calibration curve identifies a linear relationship between pH and differences in brightness levels of individual color channels of captured digital images, and
wherein the pH of the ambient aerosol is determined using the calibration curve.

8. The method of claim 1, wherein the ambient aerosol comprises a particulate air pollutant composition.

9. The method of claim 1, wherein the colorimetric pH sensitive surface comprises pH indicator paper for an acidic pH range.

10. The method of claim 1, wherein the collecting of the ambient aerosol is conducted under controlled atmospheric conditions comprising a controlled relative humidity.

11. The method of claim 10, wherein the controlled relative humidity is 90% relative humidity.

12. The method of claim 1, wherein the capturing of the digital image of the colorimetric pH sensitive surface is conducted while the colorimetric pH sensitive surface retains moisture from the collected ambient aerosol.

13. The method of claim 1, wherein the collecting of the ambient aerosol is performed using a cascade impactor.

14. The method of claim 13, wherein the capturing of the digital image is performed within 5 minutes of removal of the colorimetric pH sensitive surface from the cascade impactor.

15. The method of claim 1, wherein the camera is a component of a mobile electronic device.

16. The method of claim 15, wherein the processor is an additional component of the mobile electronic device.

17. A system configured to determine a pH of an ambient aerosol, the system comprising:
a colorimetric pH sensitive surface configured to collect the ambient aerosol;
a camera configured to capture a digital image of the colorimetric pH sensitive surface within a predefined period of time following collection of the ambient aerosol; and
a processor configured to:
separate the digital image into a plurality of individual color channel sub-images;
identify a brightness level of a first color channel sub-image and a brightness level of a second color channel sub-image; and
ascertain the pH of the ambient aerosol based on a subtraction of the brightness level of the first color channel sub-image from the brightness level of the second color channel sub-image.

18. The system of claim 17, wherein the camera and the processor are components of a same computing device.

19. The system of claim 17, further comprising:
an impactor configured to collect the ambient aerosol with the colorimetric pH sensitive surface.

* * * * *